(12) United States Patent
Ariyoshi et al.

(10) Patent No.: US 7,155,970 B2
(45) Date of Patent: Jan. 2, 2007

(54) HEAT-RADIATION TYPE FLOW SENSOR

(75) Inventors: Hiromi Ariyoshi, Kariya (JP); Chiaki Mizuno, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/178,305

(22) Filed: Jul. 12, 2005

(65) Prior Publication Data

US 2006/0075814 A1   Apr. 13, 2006

(30) Foreign Application Priority Data

Sep. 24, 2004   (JP)   ............................. 2004-276770

(51) Int. Cl.
*G01F 1/68*   (2006.01)
(52) U.S. Cl. .................................... 73/204.15
(58) Field of Classification Search ............. None
See application file for complete search history.

(56) References Cited

U.S. PATENT DOCUMENTS 3,747,577 A     7/1973   Mauch et al.
5,753,815 A  *  5/1998   Murata ..................... 73/204.15

* cited by examiner

*Primary Examiner*—Harshad Patel
(74) *Attorney, Agent, or Firm*—Posz Law Group, PLC

(57) ABSTRACT

In a heat-radiation type flow sensor, a heater resistor is connected to a fixed resistor in series with a transistor. An electrical potential between the heater resistor and the transistor is supplied to an inverting input terminal of an operational amplifier. A reference voltage is supplied to a non-inverting input terminal of the operational amplifier. An output potential of the operational amplifier is supplied to a base of the transistor. Since the electrical potential between the heater resistor and the transistor is supplied to the inverting input terminal of the operational amplifier, the airflow sensor includes only a negative feedback circuit. Thus, the airflow sensor exhibits strong endurance against electromagnetic interferences.

10 Claims, 5 Drawing Sheets

HEAT-RADIATION TYPE FLOW SENSOR

CROSS REFERENCE TO RELATED APPLICATION

This application is based on and incorporates herein by reference Japanese Patent Application No. 2004-276770 filed on Sep. 24, 2004.

FIELD OF THE INVENTION

The present invention relates to a heat-radiation type flow sensor for detecting the flow rate of a fluid flowing over a heater resistor on the basis of changes in the resistance of the heater resistor.

BACKGROUND OF THE INVENTION

A heat-radiation type flow sensor is used as an airflow sensor as disclosed in U.S. Pat. No. 3,747,577 (JP-B2-49-48893). This airflow sensor includes a first current path comprising a heater resistor J1 and a resistor J2 connected in series to the heater resistor J1 as well as a second current path comprising a temperature detection resistor J3 and a resistor J4 connected in series to the temperature detection resistor J3. In practical use, the first and second current paths are connected in parallel to each other between an NPN transistor J6 and the ground. An electrical potential appearing at a junction between the heater resistor J1 and the resistor J2 is supplied to a non-inverting input terminal (+) of an operational amplifier J5. On the other hand, an electrical potential appearing at a junction between the temperature detection resistor J3 and the resistor J4 is supplied to an inverting input terminal (−) of the operational amplifier J5.

An electrical potential appearing at the output terminal of the operational amplifier J5 is supplied as a base voltage to the base of the NPN transistor J6 for controlling the flow of a current from a power supply Vb to the first and second current paths. The electrical potential appearing at the junction between the temperature detection resistor J3 and the resistor J4 is taken as the output electrical potential V0 of the airflow sensor. This output electrical potential V0 of the airflow sensor is supplied to a control circuit J7, so that it may be used as a value of an airflow detection result.

The electrical potential appearing at the output terminal of the operational amplifier J5, that is, the voltage supplied to the base of the NPN transistor J6 changes on the basis of a difference in electrical potential between the input terminals of the operational amplifier J5. Thus, the magnitude of the current flowing to the first and second current paths is controlled in accordance with the difference in electrical potential between the input terminals of the operational amplifier J5.

In addition, in accordance with the flow rate of a fluid flowing over the heater resistor J1, the resistance of the heater resistor J1 changes and the way the resistance of the temperature detection resistor J3 placed in the vicinity of the heater resistor J1 changes also varies as well. Thus, the electrical potentials appearing at the input terminals of the operational amplifier J5 also vary in accordance with the flow rate of the fluid flowing over the heater resistor J1. As a result, the magnitude of the current flowing to the first and second current paths is controlled in accordance with the flow rate of the fluid flowing over the heater resistor J1.

In recent years, it is required that the heat-radiation type flow sensor is designed to better withstand electromagnetic interferences (EMI). The conventional circuit configuration has a positive feedback circuit inputting the electrical potential appearing at a junction between the heater resistor J1 and the resistor J2 to the non-inverting input terminal of the operational amplifier J5 as well as a negative feedback circuit inputting the electrical potential appearing at a junction between the temperature detection resistor J3 and the resistor J4 to the inverting input terminal of the operational amplifier J5.

Since a circuit system including the positive feedback circuit is instable, the circuit system is not capable of well enduring electromagnetic interferences. It is thus likely that the circuit system oscillates. Thus, a countermeasure for coping with electromagnetic interferences is needed. An example of such a countermeasure is the use of an EMI filter. However, the EMI filter adds costs.

SUMMARY OF THE INVENTION

It is thus an object of the present invention to provide a heat-radiation type flow sensor capable of well withstanding electromagnetic interferences.

According to the present invention, a heat-radiation type flow sensor includes a heater resistor, a fixed resistor and a transistor, which are connected in series to form a bridge circuit. An electrical potential between the heater resistor and the transistor is supplied to an inverting input terminal of an operational amplifier. A reference voltage is supplied to a non-inverting input terminal of the operational amplifier. An output potential of the operational amplifier is supplied to a base of the transistor. Since the electrical potential between the heater resistor and the transistor is supplied to the inverting input terminal of the operational amplifier, the flow sensor includes only a negative feedback circuit. Thus, the flow sensor exhibits strong endurance against electromagnetic interferences.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in more detail with reference to various embodiments shown in FIGS. 1 to 6. In those embodiments, a heat-radiation type flow sensor is provided in an air intake passage of an engine as an airflow sensor for measuring an airflow amount supplied to the engine.

(First Embodiment)

Figure 1:
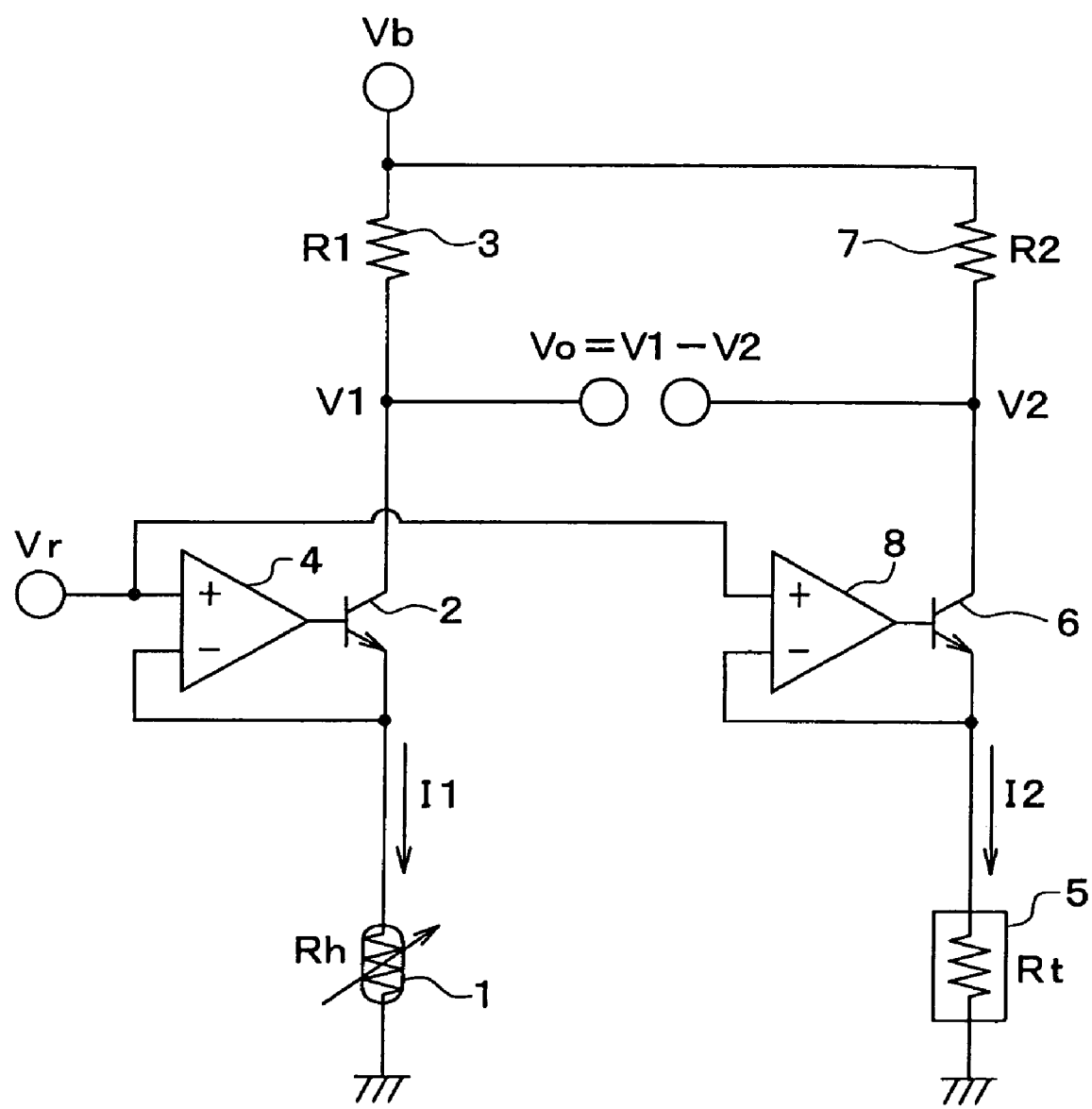
FIG. 1 is a circuit diagram showing a heat-radiation type flow sensor according to a first embodiment of the present invention.

Referring to FIG. 1, an airflow sensor comprises a heater resistor 1, an NPN transistor 2, a resistor 3 and an operational amplifier 4. The heater resistor 1 is connected to the emitter of the NPN transistor 2 and the resistor 3 is connected to the collector of the NPN transistor 2 to form a series circuit including the heater resistor 1, the NPN transistor 2 and the resistor 3 along a first current path. A power supply Vb supplies a current to the first current path.

An electrical potential appearing at a junction between the heater resistor 1 and the emitter of the NPN transistor 2 is supplied to an inverting input terminal of the operational amplifier 4. On the other hand, a constant voltage Vr is supplied to a non-inverting input terminal of the operational amplifier 4. An electrical potential appearing at the output terminal of the operational amplifier 4 is supplied to the base of the NPN transistor 2 as a base voltage to adjust the magnitude of a current flowing between the collector and emitter of the NPN transistor 2.

In addition, the airflow sensor further comprises a temperature detection resistor 5, an NPN transistor 6, a resistor 7 and an operational amplifier 8. The temperature detection resistor 5 is connected to the emitter of the NPN transistor 6 and the resistor 7 is connected to the collector of the NPN transistor 6 to form a series circuit including the temperature detection resistor 5, the NPN transistor 6 and the resistor 7 along a second current path. The power supply Vb also supplies a current to the second current path. The first current path and the second current path are connected in parallel to each other between the power supply Vb and the ground.

An electrical potential appearing at a junction between the temperature detection resistor 5 and the emitter of the NPN transistor 6 is supplied to an inverting input terminal of the operational amplifier 8. On the other hand, the constant voltage Vr is also supplied to a non-inverting input terminal of the operational amplifier 8. An electrical potential appearing at the output terminal of the operational amplifier 8 is supplied to the base of the NPN transistor 6 as a base voltage to adjust the magnitude of a current flowing between the collector and emitter of the NPN transistor 6.

In the above configuration, V1 denotes an electrical potential appearing at a junction between the collector of the NPN transistor 2 and the resistor 3 whereas V2 denotes an electrical potential appearing at a junction between the collector of the NPN transistor 6 and the resistor 7. In this case, a difference V0 (=V1−V2) between the electrical potential V1 and the electrical potential V2 is taken as the output of the airflow sensor and supplied to a control circuit not shown in the figure.

The airflow sensor is set so that, when the flow rate of air flowing over the heater resistor 1 is zero, the output of the airflow sensor is also zero. That is, the resistance R1 of the resistor 3 and the resistance R2 of the resistor 7 are set so that the equation I1×R1=I2×R2 holds true, I1 denotes a current flowing through the heater resistor 1 and I2 denotes a current flowing through the temperature detection resistor 5.

The current I1 flowing through the heater resistor 1 and the current I2 flowing through the temperature detection resistor 5 can be expressed by the following equations:

$$I1 = Vr/Rh0 \text{ and } I2 = Vr/Rt$$

where Rh0 denotes the resistance Rh of the heater resistor 1 for an airflow of 0 and Rt denotes the resistance of the temperature detection resistor 5.

Thus, from the above equations, if the resistance R2 satisfies the equation R2=R1×Rt/Rh0, the output V0 (=V1−V2) of the airflow sensor is zero.

With such setting, when air flows over the heater resistor 1 at a flow rate, the resistance Rh of the heater resistor 1 decreases due to radiation of heat. It is assumed that the resistance Rh of the heater resistor 1 decreases to Rht (=Rh0−ΔRh) where notation ΔRh denotes a decrease in resistance Rh. At that time, the current I1t flowing through the heater resistor 1 can be expressed as follows:

$$I1t = Vr/(Rh0 - \Delta Rh).$$

Thus, the electrical potential V1 appearing at the junction between the collector of the NPN transistor 2 and the resistor 3 varies by a change of ΔI1×R1 where symbol ΔI1 denotes a change in current It (ΔI1=I1t−I1) as a change obtained as a result of the change ΔRh. As a result, the output V0 (=V1−V2) also changes by the change of ΔI1×R1.

As the flow rate increases, the change ΔRh of the resistance Rh of the heater resistor 1 also rises and the output V0 (=V1−V2) of the airflow sensor increases as well. Thus, the flow rate of air flowing over the heater resistor 1 can be detected.

It is to be noted that, as for the second current path, the heat radiation of the heater resistor 1 affects the temperature detection resistor 5, varying the resistance Rt of the temperature detection resistor 5. Thus, the electrical potential supplied to the inverting input terminal of the operational amplifier 8 also changes in accordance with the varying resistance Rt of the temperature detection resistor 5. Namely, the heat radiation of the heater resistor 1 varies the resistance Rt of the temperature detection resistor 5 and, in turn, the varying resistance Rt of the temperature detection resistor 5 changes the electrical potential V2 appearing at a junction between the collector of the NPN transistor 6 and the resistor 7. As a result, the temperature detection resistor 5 functions to compensate a detected flow rate of the fluid for an error generated in the detected flow rate as a flow-rate change reflected in a characteristic representing a relation between the flow rate and the temperature of the fluid.

As described above, in the first embodiment, an electrical potential appearing at a junction between the heater resistor 1 and the emitter of the NPN transistor 2 is supplied to the inverting input terminal of the operational amplifier 4, but the constant voltage Vr is supplied to the non-inverting input terminal of the operational amplifier 4. Thus, the configuration of the airflow sensor includes only a negative feedback circuit and no positive feedback circuit, which may cause oscillation of the circuit when electric noises are applied. As a result, the airflow sensor is capable of operating stably as a driving circuit exhibiting strong endurance against electromagnetic interferences.

(Second Embodiment)

Figure 2:
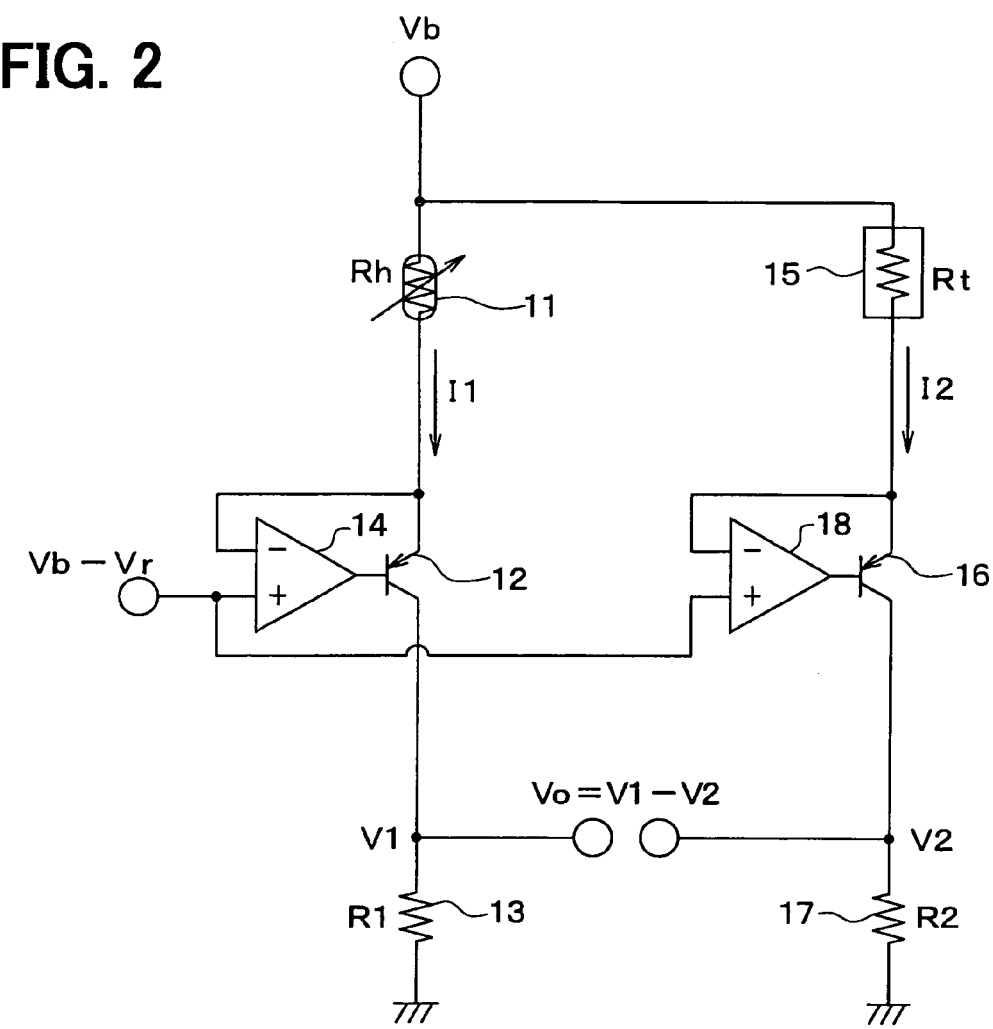
FIG. 2 is a circuit diagram showing a heat-radiation type flow sensor according to a second embodiment of the present invention.

As shown in FIG. 2, an airflow sensor comprises a heater resistor 11, a PNP transistor 12, a resistor 13 and an operational amplifier 14. The heater resistor 11 is connected to the emitter of the PNP transistor 12 and the resistor 13 is connected to the collector of the PNP transistor 12 to form a series circuit including the heater resistor 11, the PNP transistor 12 and the resistor 13 along a first current path. A power supply Vb supplies a current to the first current path.

An electrical potential appearing at a junction between the heater resistor 11 and the emitter of the PNP transistor 12 is supplied to an inverting input terminal of the operational amplifier 14. On the other hand, a constant voltage (Vb−Vr) lower than the power supply Vb by a predetermined voltage Vr is supplied to a non-inverting input terminal of the operational amplifier 14. An electrical potential appearing at the output terminal of the operational amplifier 14 is supplied to the base of the PNP transistor 12 as a base voltage to adjust the magnitude of a current flowing between the emitter and collector of the PNP transistor 12.

The airflow sensor further comprises a temperature detection resistor 15, a PNP transistor 16, a resistor 17 and an operational amplifier 18. The temperature detection resistor 15 is connected to the emitter of the PNP transistor 16 and the resistor 17 is connected to the collector of the PNP transistor 16 to form a series circuit including the temperature detection resistor 15, the PNP transistor 16 and the resistor 17 along a second current path. The power supply Vb also supplies a current to the second current path. The first current path and the second current path are connected in parallel to each other between the power supply Vb and the ground.

An electrical potential appearing at a junction between the temperature detection resistor 15 and the emitter of the PNP transistor 16 is supplied to an inverting input terminal of the operational amplifier 18. On the other hand, the constant voltage (Vb−Vr) is also supplied to a non-inverting input terminal of the operational amplifier 18. An electrical potential appearing at the output terminal of the operational amplifier 18 is supplied to the base of the PNP transistor 16 as a base voltage to adjust the magnitude of a current flowing between the emitter and collector of the PNP transistor 16.

In the above airflow sensor, V1 denotes an electrical potential appearing at a junction between the collector of the PNP transistor 12 and the resistor 13 whereas V2 denotes an electrical potential appearing at a junction between the collector of the PNP transistor 16 and the resistor 17. In this case, a difference V0 (=V1−V2) between the electrical potential V1 and the electrical potential V2 is taken as the output of the airflow sensor and supplied to a control circuit as an airflow sensor signal indicative of an airflow amount.

The airflow sensor carries out the same operations as those of the first embodiment except that the heater resistor 11 and the temperature detection resistor 15 are provided on the emitter side of the PNP transistors 12 and 16 (on the power supply Vb side). On the other hand, the resistors 13 and 17 are provided on the collector side of the PNP transistors 12 and 16 (on the ground side).

Thus, the airflow sensor in the second embodiment also includes only a negative feedback circuit. As a result, the airflow sensor is capable of operating stably exhibiting strong endurance against electromagnetic interferences.

(Third Embodiment)

Figure 3:
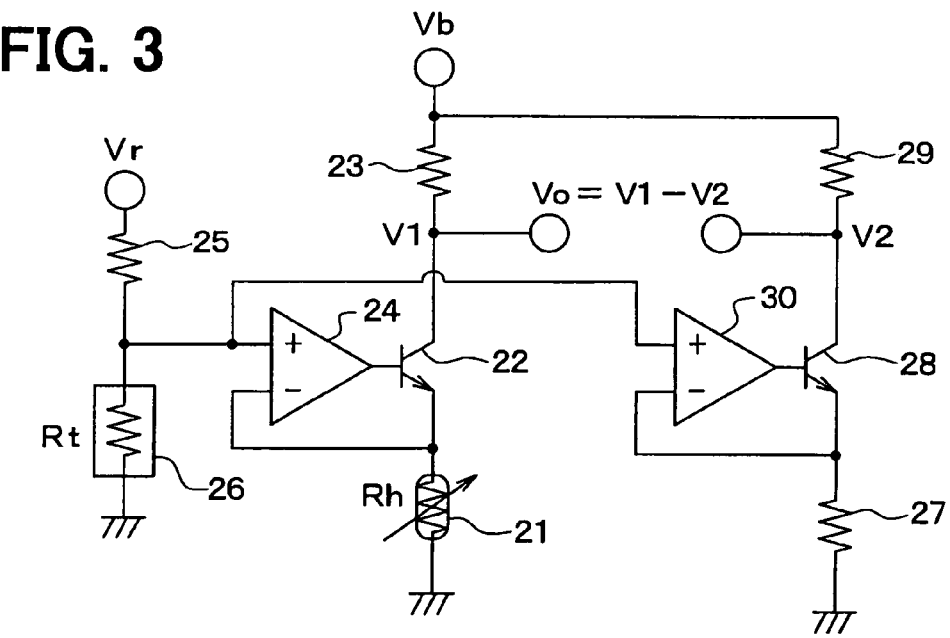
FIG. 3 is a circuit diagram showing a heat-radiation type flow sensor according to a third embodiment of the present invention.

As shown in FIG. 3, an airflow sensor comprises a heater resistor 21, an NPN transistor 22, a resistor 23 and an operational amplifier 24. The heater resistor 21, the NPN transistor 22, the resistor 23 and the operational amplifier 24 are connected to each other in the same configuration as the first embodiment shown in FIG. 1 except that an electrical potential obtained by division of a constant voltage Vr through a voltage divider comprising a resistor 25 and a temperature detection resistor 26 is supplied to a non-inverting input terminal of the operational amplifier 24. Thus, the temperature detection resistor 26 is capable of compensating a detected flow rate of the fluid for an error generated in the detected flow rate as a flow-rate change reflected in a characteristic representing a relation between the flow rate and the temperature of the fluid.

In addition, the airflow sensor further comprises a resistor 27, an NPN transistor 28, a resistor 29 and an operational amplifier 30 in the same way as the first embodiment shown in FIG. 1 except that the resistor 27 serves as a substitute for the temperature detection resistor 5 employed in the first embodiment. The electrical potential obtained by division of the constant voltage Vr through the voltage divider comprising the resistor 25 and the temperature detection resistor 26 is also supplied to a non-inverting input terminal of the operational amplifier 30.

The airflow sensor carries out generally the same operations as those of the first embodiment. The electrical potential supplied to the non-inverting input terminals of the operational amplifiers 24 and 30 is subjected to the compensation of a detected flow rate of the fluid for an error generated in the detected flow rate as a flow-rate change reflected in a characteristic representing a relation between the flow rate and the temperature of the fluid. Thus, the detected flow rate of the fluid is compensated for an error generated in the detected flow rate as a flow-rate change reflected in a characteristic representing a relation between the flow rate and the temperature of the fluid. As a result, the airflow sensor is capable of exhibiting the same effects as the first embodiment.

(Fourth Embodiment)

Figure 4:
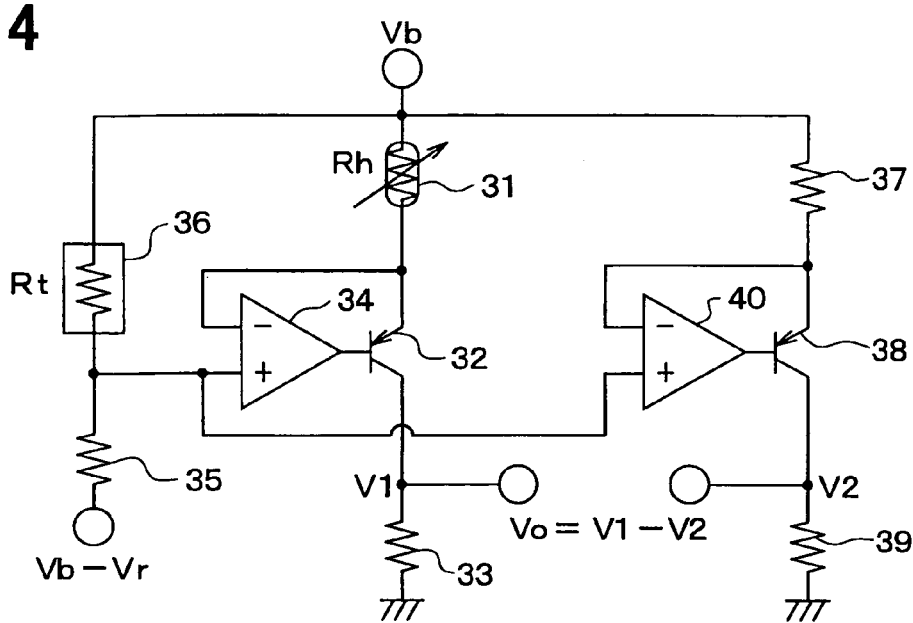
FIG. 4 is a circuit diagram showing a heat-radiation type flow sensor according to a fourth embodiment of the present invention.

As shown in FIG. 4, an airflow sensor comprises a heater resistor 31, a PNP transistor 32, a resistor 33 and an operational amplifier 34. The heater resistor 31, the PNP transistor 32, the resistor 33 and the operational amplifier 34 are connected to each other in the same configuration as the second embodiment shown in FIG. 2 except that an electrical potential obtained by division of a voltage drop Vr from a power supply Vb to an electrical-potential point corresponding to a constant voltage (Vb−Vr) through a voltage divider comprising a resistor 35 and a temperature detection resistor 36 is supplied to a non-inverting input terminal of the operational amplifier 34. Thus, the temperature detection resistor 36 is capable of compensating a detected flow rate of the fluid for an error generated in the detected flow rate as a flow-rate change reflected in a characteristic representing a relation between the flow rate and the temperature of the fluid.

In addition, the airflow sensor also comprises a resistor 37, a PNP transistor 38, a resistor 39 and an operational amplifier 40 in the same configuration as the second embodiment shown in FIG. 2 except that the resistor 37 serves as a substitute for the temperature detection resistor 15 employed in the second embodiment. The electrical potential obtained by division of the voltage drop Vr from the power supply Vb to the electrical-potential point corresponding to the constant voltage (Vb−Vr) through the voltage divider comprising the resistor 35 and the temperature detection resistor 36 is also supplied to a non-inverting input terminal of the operational amplifier 40.

The airflow sensor carries out generally the same operations as those of the second embodiment. The electrical potential supplied to the non-inverting input terminals of the operational amplifiers 34 and 40 is subjected to the compensation of a detected flow rate of the fluid for an error generated in the detected flow rate as a flow-rate change reflected in a characteristic representing a relation between the flow rate and the temperature of the fluid. Thus, the detected flow rate of the fluid is compensated for an error generated in the detected flow rate as a flow-rate change reflected in a characteristic representing a relation between the flow rate and the temperature of the fluid. As a result, the airflow sensor is capable of exhibiting the same effects as the second embodiment.

(Fifth Embodiment)

Figure 5:
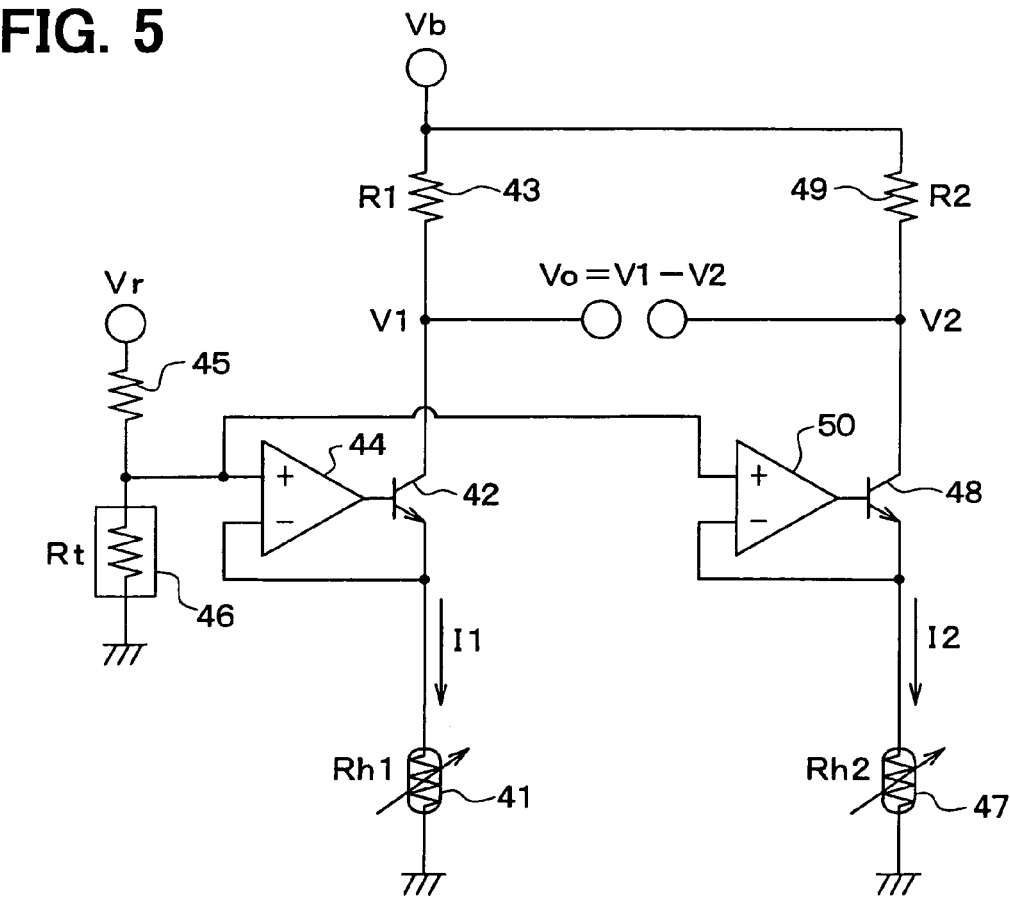
FIG. 5 is a circuit diagram showing a heat-radiation type flow sensor according to a fifth embodiment of the present invention as an airflow sensor.

As shown in FIG. 5, an airflow sensor comprises a first heater resistor 41, an NPN transistor 42, a resistor 43, an operational amplifier 44, a resistor 45 and a temperature detection resistor 46. These components operates in the same way the heater resistor 21, the NPN transistor 22, the resistor 23, the operational amplifier 24, the resistor 25 and the temperature detection resistor 26, which are employed in the third embodiment shown in FIG. 3.

In addition, the airflow sensor also comprises a second heater resistor 47, an NPN transistor 48, a resistor 49 and an operational amplifier 50 in the same configuration as the third embodiment shown in FIG. 3 except that the second heater resistor 47 provided at a location close to the first heater resistor 41 serves as a substitute for the resistor 27 employed in the third embodiment shown in FIG. 3. That is, the remaining components of the configuration, i.e., the NPN transistor 48, the resistor 49 and the operational amplifier 50, operates in the same way as the NPN transistor 28, the resistor 29 and the operational amplifier 30, which are employed in the third embodiment.

With a zero flow rate in the airflow sensor, the resistance Rh1 of the first heater resistor 41 has the same value as the resistance Rh2 of the second heater resistor 47. Since this airflow sensor carries out the same operations as the third embodiment, the same effects as the third embodiment can be demonstrated.

In the case of the fifth embodiment, however, the second heater resistor 47 is employed. Thus, an electrical potential V2 appearing at a junction between the collector of the NPN transistor 48 and the resistor 49 varies in accordance with changes in resistance of the second heater resistor 47 due to heat radiation by the second heater resistor 47. As a result, the flow rate of air can be detected on the basis of V0 (=V1−V2) changing to accompany variations in V1 and V2. Here, V1 denotes an electrical potential, which appears at a junction between the collector of the NPN transistor 42 and the resistor 43, and varies as the resistance of the first heater resistor 41 changes. Similarly, V2 denotes an electrical potential, which appears at a junction between the collector of the NPN transistor 48 and the resistor 49, and varies as the resistance of the second heater resistor 47 changes.

In the fifth embodiment, the first heater resistor 41 and the second heater resistor 47 are provided at locations close to each other. Thus, the locations of the first heater resistor 41 and the second heater resistor 47 generate thermal coupling in which heat radiated by the first heater resistor 41 affects the second heater resistor 47 and heat radiated by the second heater resistor 47 affects the first heater resistor 41. The effect of the thermal coupling varies in dependence on whether air flows in the direction from the first heater resistor 41 to the second heater resistor 47 or in the direction from the second heater resistor 47 to the first heater resistor 41.

It is assumed for example that air flows in the direction from the first heater resistor 41 to the second heater resistor 47. In this case, since heat radiated by the first heater resistor 41 affects the second heater resistor 47, the resistance Rh1 of the first heater resistor 41 and the resistance Rh2 of the second heater resistor 47 satisfy the relation Rh1<Rh2. In addition, the higher the flow rate of the air, the larger the resistance difference (Rh2−Rh1). If air flows in the direction from the second heater resistor 47 to the first heater resistor 41 conversely, on the other hand, the resistance Rh1 of the first heater resistor 41 and the resistance Rh2 of the second heater resistor 47 satisfy the inverted relation Rh1>Rh2. Also in this case, the higher the flow rate of the air, the larger the resistance difference (Rh1−Rh2).

Thus, the sign of the output V0 (=V1−V2) is inverted from the positive sign to a negative one or vice versa in accordance with the direction of the flow of the air. In addition, the higher the flow rate of the air, the larger the absolute value of the output V0 (=V1−V2). As a result, the embodiment is capable of detecting not only the flow rate of the airflow, but also the direction of the airflow.

As described above, the fifth embodiment is obtained by applying the second heater resistor to the third embodiment as a substitute for a resistor employed in the third embodiment. It is to be noted that another embodiment can also be obtained by applying a second heater resistor to the fourth embodiment as a substitute for a resistor employed in the fourth embodiment.

(Sixth Embodiment)

Figure 6:
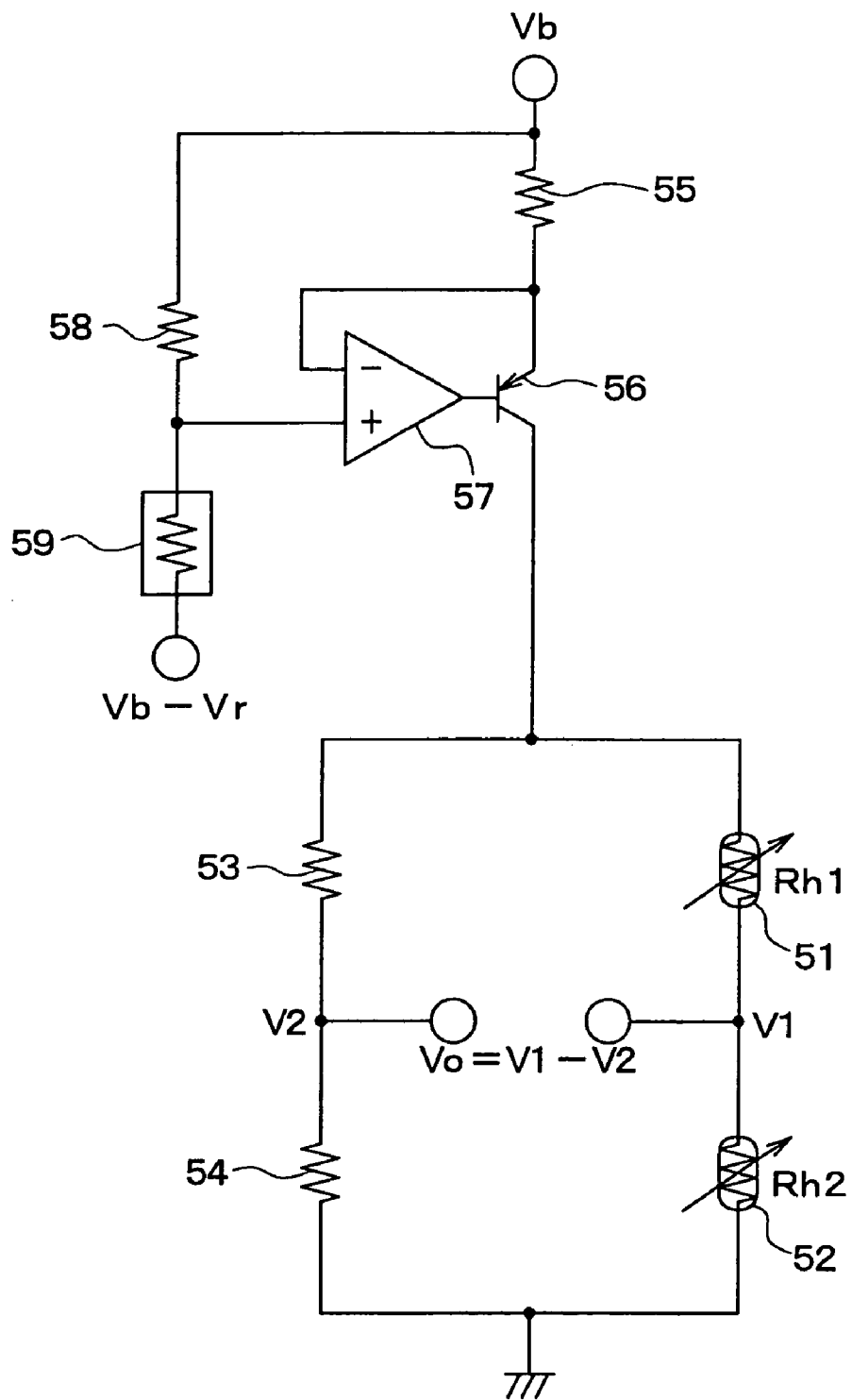
FIG. 6 is a circuit diagram showing a heat-radiation type flow sensor according to a sixth embodiment of the present invention.
Figure 7:
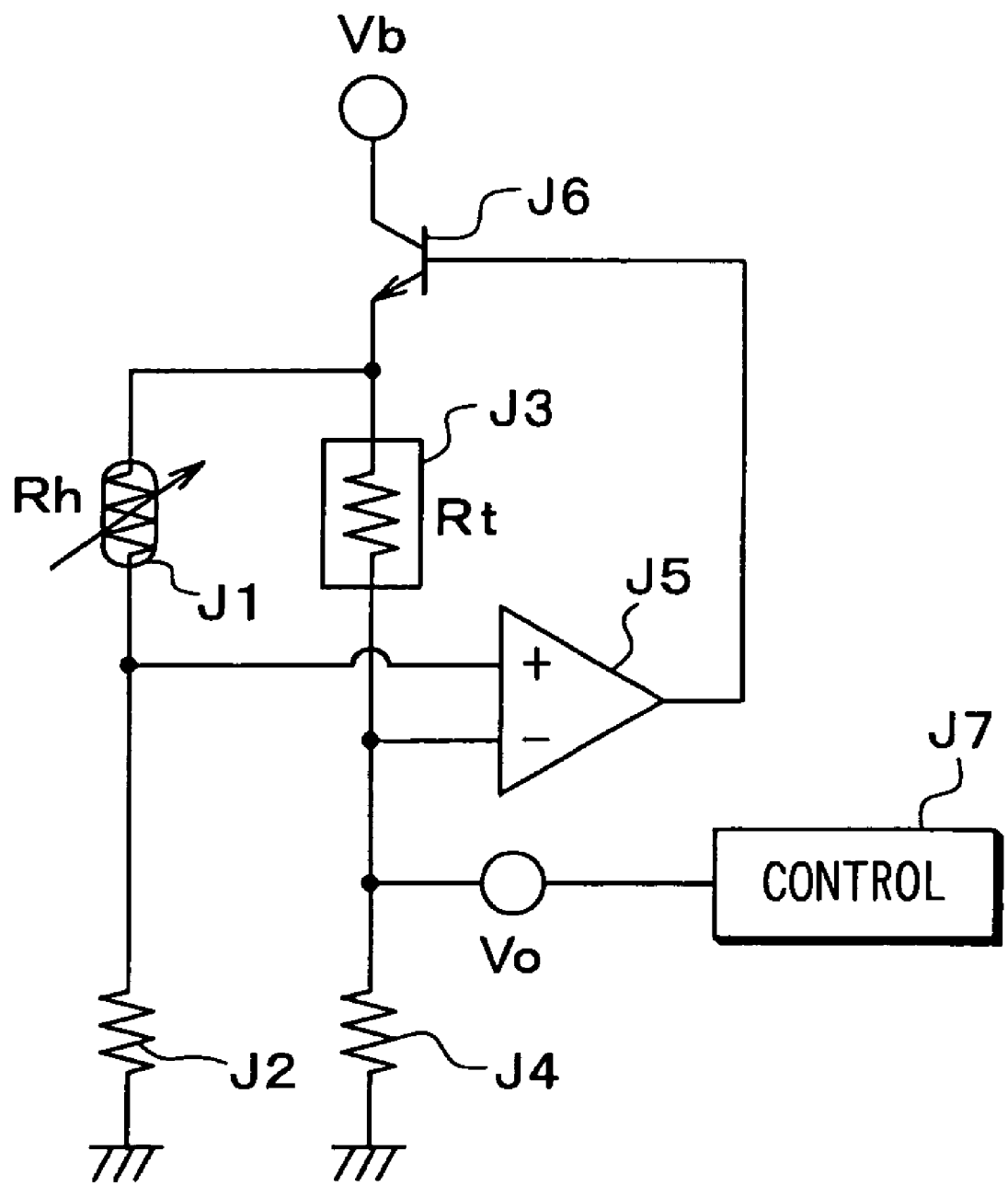
FIG. 7 is a circuit diagram showing a conventional heat-radiation type flow sensor.

As shown in FIG. 6, an airflow sensor includes a bridge circuit comprising a first heater resistor 51, a second heater resistor 52, a resistor 53 and a resistor 54. The bridge circuit comprises a first current path and a second current path connected in parallel to the first current path. The first current path is a series circuit comprising the first heater resistor 51 and the second heater resistor 52 whereas the second current path is a series circuit comprising the resistors 53 and 54. An electrical-potential difference V0 between an electrical potential V1 appearing at a junction between the first heater resistor 51 and the second heater resistor 52 and an electrical potential V2 appearing at a junction between the resistor 53 and the resistor 54 is taken as the output of the airflow sensor.

In addition, the airflow sensor includes a resistor 55, a PNP transistor 56, an operational amplifier 57, a resistor 58 and a temperature detection resistor 59. The collector of the PNP transistor 56 is connected to the first and second current paths while the emitter of the PNP transistor 56 is connected to the resistor 55. An electrical potential appearing at a junction between the resistor 55 and the emitter of the PNP transistor 56 is supplied to the inverting input terminal of the operational amplifier 57. It is to be noted that the resistor 58 and the temperature detection resistor 59 are connected in the same configuration as the resistor 35 and the temperature detection resistor 36 are connected in the fourth embodiment. An electrical potential appearing at the output terminal of the operational amplifier 57 is supplied to the base of the PNP transistor 56 as a base voltage to adjust the magnitude of a current flowing between the emitter and collector of the PNP transistor 56.

As described above, the configuration includes the first and second heater resistors 51 and 52. Thus, the electrical potential V1 appearing at the junction between the first heater resistor 51 and the second heater resistor 52 varies in accordance with variations in resistances caused by heat radiations from the first heater resistor 51 and the second heater resistor 52. As a result, the flow rate of the air flow can be detected on the basis of the output V0 (=V1–V2), which varies in dependence on changes in electrical potential V1 with respect to the electrical potential V2 appearing at a junction between the resistors 53 and 54.

In the configuration, the first heater resistor 51 and the second heater resistor 52 are provided at locations close to each other, generating thermal coupling in which heat radiated by the first heater resistor 51 affects the second heater resistor 52 and heat radiated by the second heater resistor 52 affects the first heater resistor 51. The resistance Rh1 of the first heater resistor 51 and the resistance Rh2 of the second heater resistor 52 satisfy the relations described in the explanation of the fifth embodiment.

Thus, the sign of the output V0 (=V1–V2) is inverted from the positive sign to a negative one or vice versa in accordance with the direction of the airflow. In addition, the higher the flow rate of the airflow, the larger the absolute value of the output V0 (=V1–V2). As a result, the embodiment is capable of detecting not only the flow rate of the airflow, but also the direction of the airflow.

The present invention is not limited to the above embodiments but may be implemented in many other ways without departing from the spirit of the invention.

What is claimed is:

1. A heat-radiation type flow sensor comprising:
   a heater resistor, a first transistor and a first resistor, which are connected to each other in series to form a first current path to allow a first current to flow in the first current path from a power supply; and
   a first operational amplifier for controlling the first current flowing between an emitter and a collector of the first transistor,
   wherein:
   the emitter of the first transistor is connected to the heater resistor;
   the collector of the first transistor is connected to the first resistor;
   an electrical potential appearing at a junction between the emitter of the first transistor and the heater resistor is supplied to an inverting input terminal of the first operational amplifier;
   a reference voltage is supplied to a non-inverting input terminal of the first operational amplifier;
   an electrical potential appearing at an output terminal of the first operational amplifier is supplied to a base of the first transistor; and
   an electrical potential appearing at a junction between the collector of the first transistor and the first resistor is taken as an output varying with a flow amount of fluid.

2. The heat-radiation type flow sensor according to claim 1 further comprising:
   a temperature detection resistor, a second NPN transistor and a second resistor, which are connected to each other in series to form a second current path, which is connected to the power supply in parallel to the first current path so as to allow a second current to flow from the power supply in the second current path; and
   a second operational amplifier is for controlling the second current flowing between an emitter and a collector of the second NPN transistor,
   wherein:
   the first transistor is an NPN transistor;
   the emitter of the second NPN transistor is connected to the temperature detection resistor;
   the collector of the second NPN transistor is connected to the second resistor;
   an electrical potential appearing at a junction between the emitter of the second NPN transistor and the temperature detection resistor is supplied to an inverting input terminal of the second operational amplifier;
   the reference voltage is a constant voltage and supplied to both the non-inverting input terminal of the first operational amplifier and a non-inverting input terminal of the second operational amplifier;
   an electrical potential appearing at an output terminal of the second operational amplifier is supplied to a base of the second NPN transistor as a base voltage; and
   a difference between the electrical potential and an electrical potential appearing at a junction between the collector of the second NPN transistor and the second resistor is taken as an output varying with the flow amount and a temperature.

3. A heat-radiation type flow sensor comprising:
   a heater resistor, a first PNP transistor and a first resistor, which are connected to each other in series to form a first current path to allow a first current to flow from a power supply; and
   a first operational amplifier for controlling the first current flowing between an emitter and a collector of the first PNP transistor,
   wherein:
   the emitter of the first PNP transistor is connected to the heater resistor;
   the collector of the first PNP transistor is connected to the first resistor;
   an electrical potential appearing at a junction between the emitter of the first PNP transistor and the heater resistor is supplied to an inverting input terminal of the first operational amplifier;
   a constant electrical potential lower than the power supply by a constant voltage is supplied to a non-inverting input terminal of the first operational amplifier;
   an electrical potential appearing at the output terminal of the first operational amplifier is supplied to a base of the first PNP transistor as a base voltage; and
   an electrical potential appearing at a junction between the collector of the first PNP transistor and the first resistor is taken as an output varying with a flow amount of fluid.

4. The heat-radiation type flow sensor according to claim 3, further comprising:
   a temperature detection resistor, a second PNP transistor and a second resistor, which are connected to each other in series to form a second current path connected to the power supply in parallel to the first current path so as to allow a second current to flow from the power supply; and
   a second operational amplifier for controlling the second current flowing between an emitter and a collector of the second PNP transistor,
   wherein:
   the emitter of the second PNP transistor is connected to the temperature detection resistor;
   the collector of the second PNP transistor is connected to the second resistor;
   an electrical potential appearing at a junction between the emitter of the second PNP transistor and the temperature detection resistor is supplied to an inverting input terminal of the second operational amplifier;
   the electrical potential is supplied to a non-inverting input terminal of the second operational amplifier;

an electrical potential appearing at an output terminal of the second operational amplifier is supplied to a base of the second PNP transistor; and a difference between the electrical potential and an electrical potential appearing at a junction between the collector of the second NPN transistor and the second resistor is taken as the output varying with the flow amount of fluid and a temperature.

5. A heat-radiation type flow sensor comprising:

a heater resistor, an NPN transistor and a first resistor, which are connected to each other in series to form a first current path to allow a first current to flow from a power supply;

an operational amplifier for controlling the first current flowing between an emitter and a collector of the NPN transistor; and a second resistor and a temperature detection resistor connected in series to each other to divide a constant voltage, wherein:

the emitter of the NPN transistor is connected to the heater resistor;

the collector of the NPN transistor is connected to the first resistor;

an electrical potential appearing at a junction between the emitter of the NPN transistor and the heater resistor is supplied to an inverting input terminal of the operational amplifier;

an electrical potential appearing at a junction between the second resistor and the temperature detection resistor is supplied to a non-inverting input terminal of the operational amplifier;

an electrical potential appearing at the output terminal of the operational amplifier is supplied to a base of the NPN transistor; and an electrical potential appearing at a junction between the collector of the NPN transistor and the first resistor is taken as an output varying with a flow amount of fluid.

6. A heat-radiation type flow sensor comprising:

a heater resistor, a PNP transistor and a first resistor, which are connected to each other in series to form a first current path to allow a first current to flow from a power supply;

an operational amplifier for controlling the first current flowing between an emitter and a collector of the PNP transistor; and a second resistor and a temperature detection resistor, which are connected in series to each other to form a voltage divider for dividing a voltage drop from the power supply to an electrical-potential point corresponding to a constant voltage, wherein:

the emitter of the PNP transistor is connected to the heater resistor;

the collector of the PNP transistor is connected to the first resistor;

an electrical potential appearing at a junction between the emitter of the PNP transistor and the heater resistor is supplied to an inverting input terminal of the operational amplifier;

an electrical potential appearing at a junction between the second resistor and the temperature detection resistor is supplied to a non-inverting input terminal of the operational amplifier;

an electrical potential appearing at the output terminal of the operational amplifier is supplied to a base of the PNP transistor; and an electrical potential appearing at a junction between the collector of the PNP transistor and the first resistor is taken as an output varying with a flow amount of fluid.

7. A heat-radiation type flow sensor comprising:

a first heater resistor, a first NPN transistor and a first resistor, which are connected to each other in series to form a first current path to allow a first current to flow from a power supply;

a first operational amplifier for controlling the current flowing between an emitter and a collector of the first NPN transistor;

a second heater resistor, a second NPN transistor and a second resistor, which are connected to each other in series to form a second current path connected to the power supply in parallel to the first current path to allow a second current to flow from the power supply; and a second operational amplifier for controlling the second current flowing between the emitter and collector of the second NPN transistor, wherein:

the emitter of the first NPN transistor is connected to the first heater resistor;

the collector of the first NPN transistor is connected to the first resistor;

an electrical potential appearing at a junction between the emitter of the first NPN transistor and the first heater resistor is supplied to an inverting input terminal of the first operational amplifier;

a predetermined voltage is supplied to a non-inverting input terminal of the first operational amplifier;

an electrical potential appearing at an output terminal of the first operational amplifier is supplied to a base of the first NPN transistor;

the second heater resistor is provided in the vicinity of the first heater resistor at a location resulting in thermal coupling with the first heater resistor;

an emitter of the second NPN transistor is connected to the second heater resistor;

a collector of the second NPN transistor is connected to the second resistor;

an electrical potential appearing at a junction between the emitter of the second NPN transistor and the second heater resistor is supplied to an inverting input terminal of the second operational amplifier;

the predetermined voltage is supplied to a non-inverting input terminal of the second operational amplifier;

an electrical potential appearing at an output terminal of the second operational amplifier is supplied to a base of the second NPN transistor; and an electrical-potential difference between an electrical potential and an electrical potential is taken as an output varying with a flow amount of fluid, where the electrical potential appears at a junction between the collector of the first NPN transistor and the first resistor whereas the electrical potential appears at a junction between the collector of the second NPN transistor and the second resistor.

8. The heat-radiation type flow sensor according to claim 7, wherein the predetermined voltage supplied to the non-inverting input terminal of the first operational amplifier and the non-inverting input terminal of the second operational amplifier is obtained by dividing a constant voltage by a voltage divider comprising a third resistor and a temperature detection resistor.

9. A heat-radiation type flow sensor comprising:
a bridge circuit including:
- a first heater resistor and a second heater resistor provided in the vicinity of the first heater resistor at a location resulting in thermal coupling with the first heater resistor connected to the second heater resistor in series to form a first current path; and
- a first resistor and a second resistor connected to the first resistor in series to form a second current path;

a third resistor and a PNP transistor, which are connected to the bridge circuit in series to supply a current to the bridge circuit from a power supply; and an operational amplifier for controlling a current flowing between an emitter and a collector of the PNP transistor, wherein:
- the collector of the PNP transistor is connected to the bridge circuit;
- the emitter of the PNP transistor is connected to the third resistor;
- an electrical potential appearing between the emitter of the PNP transistor and the third resistor is supplied to an inverting input terminal of the operational amplifier;
- a predetermined voltage is supplied to a non-inverting input terminal of the operational amplifier;
- an electrical potential appearing at the output terminal of the operational amplifier is supplied to a base of the PNP transistor; and
- an electrical-potential difference between an electrical potential and an electrical potential is taken as an output varying with a flow amount of fluid, where the electrical potential appears at a junction between the first heater resistor and the second heater resistor and the electrical potential appears at a junction between the first resistor and the second resistor.

10. The heat-radiation type flow sensor according to claim 9, wherein the predetermined voltage supplied to the non-inverting input terminal of the operational amplifier is obtained by a division of a difference between the power supply and a constant electrical potential by a voltage divider comprising a third resistor and a temperature detection resistor.

* * * * *